(12) United States Patent
Millward

(10) Patent No.: US 10,729,104 B2
(45) Date of Patent: Aug. 4, 2020

(54) PET TOY SIMULATING ANIMAL SOUND

(71) Applicant: Eric William Millward, Evanston, IL (US)

(72) Inventor: Eric William Millward, Evanston, IL (US)

(*) Notice: Subject to any disclaimer, the term of this patent is extended or adjusted under 35 U.S.C. 154(b) by 280 days.

(21) Appl. No.: 15/963,993

(22) Filed: Apr. 26, 2018

(65) Prior Publication Data

US 2019/0327936 A1 Oct. 31, 2019

(51) Int. Cl.
*A01K 15/02* (2006.01)
*A63H 3/06* (2006.01)

(52) U.S. Cl.
CPC .............. *A01K 15/025* (2013.01); *A63H 3/06* (2013.01)

(58) Field of Classification Search
CPC ........................... A01K 15/025; A01K 15/026
See application file for complete search history.

(56) References Cited

U.S. PATENT DOCUMENTS

| | | | | |
|---|---|---|---|---|
| 9,788,528 | B2 * | 10/2017 | Spring | A01K 15/026 |
| 9,992,975 | B2 * | 6/2018 | Wolfe, Jr. | A01K 15/025 |
| 10,015,951 | B2 * | 7/2018 | Woolwine | A01K 15/025 |
| 10,433,523 | B2 * | 10/2019 | Stone | A01K 29/00 |

* cited by examiner

*Primary Examiner* — Monica L Barlow
(74) *Attorney, Agent, or Firm* — Patent Partners LLC

(57) ABSTRACT

The invention is a novel pet toy wherein a specialized reed and accordion style squeaker tube is attached to a dual layer self-inflating chamber and mimics the "moo" of a cow when an animal depresses the toy. A plush fabric outer layer is designed to look like a cow.

8 Claims, 8 Drawing Sheets

PET TOY SIMULATING ANIMAL SOUND

FIELD

The present invention relates generally to stimulating, encouraging and motivating games and methods of playing regarding pets, e.g. dogs and cats. More particularly, the invention relates to motivational games, toys and methods for assessing the pet training skills in the form of games or puzzles that incite pet interaction and memory skills.

PRIOR ART

There are many squeaking pet toys on the market, and most have random squeaking sounds which may incite pet interaction, but do not sound like an animal. The benefit of such a toy is clear from research studies of animal's auditory response from actual animals such as cows, elk, cats or even other dogs.

BRIEF DESCRIPTION OF THE INVENTION

The novel squeaker design of the inventive toy has been designed to make a sound that closely resembles the "moo" of a cow. The toy is composed of various plastic injection molded parts nested inside each other and positioned within an air sealed self-inflating chamber. The self-inflating bag chamber can also be filled with polyurethane foam.

The object of the present invention is to motivate and maintain interest of a pet. The self-inflating bag responds when squeezed by filling with air and creating a low pitch sound that mimics a cow's "moo" as the air travels through a squeaker and reed nested into an accordion style tube.

The combination of parts includes a self-inflating bag chamber which is housed within a flexible outer shell and which two layers may be filled with filled with polyurethane foam to aid in shape retention of the toy. An accordion style tube is affixed to the inner and outer chambers and contains a large reed and toning wedge, and a molded snap-fit cap that regulates air flow within the bag.

BACKGROUND OF THE INVENTION

The invention most closely corresponds with USPTO Class 119/707 wherein Class 119 relates to animal husbandry and sub-class 707 includes toys, lures, fetch and related devices.

In its simplest form, the invention relates to a novel toy for pets which mimics the "moo" sound of a cow by utilizing a novel squeaker construct and dual chambered body. When compressed, the perforations in the cap allow air to be filled into the self-inflating inner chamber, and as the air traverses through these sections, the reed and toning wedge create the specific sound of a cow's "moo" to stimulate pet play.

The Invention

SUMMARY, OBJECTS AND ADVANTAGES

It well known that pets do experience a sense of boredom, and if not addressed, may manifest in negative behavior such as chewing furniture or going to the bathroom in undesirable locations in the pet owner's home. The inventive toy is designed to capture and retain a pet's interest whether the pet owner is away or home. The pet owner can manipulate the toy in some way to actively play with the pet as well. The toy is not designed to "replace" human interaction, but rather to help keep a pet entertained even if the owner is not also interacting with the toy and pet.

The inventive toy includes an outer plush fabric layer in the design of a cow, and a self-inflating inner chamber housed within a flexible outer chamber, within polyurethane foam may be inserted between the two chambers, an accordion style tube that houses a large reed and toning wedge; and a molded snap-fit cap that regulates air flow within the bag.

BRIEF DESCRIPTION OF THE DRAWINGS

The invention is described in further detail by reference to eight (8) drawings sufficient in detail to describe the invention in which.

DETAILED DESCRIPTION, INCLUDING BEST MODES OF CARRYING OUT THE INVENTION

Figure 1:
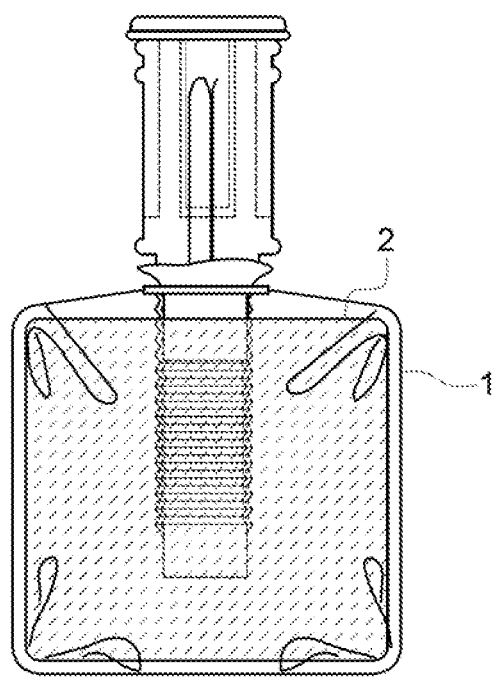
FIG. 1 is an illustration of the outer shell and the inner chamber.

FIG. 1 shows the self-inflating bag chamber 1 wherein the polyurethane material filler 2 is shown as housed within the self-inflating bag. When the toy is squeezed, the bag inflates with air creating a low pitch sound that mimics a cow's "moo".

Figure 2:
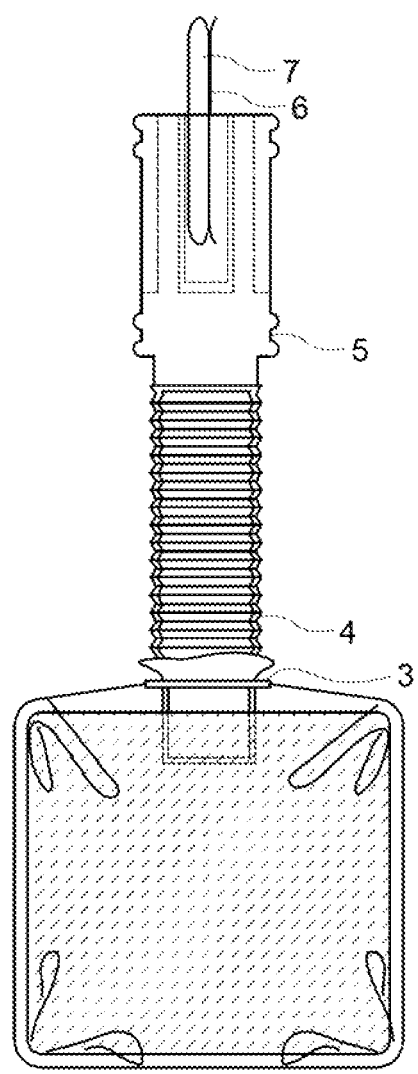
FIG. 2 shows the squeaker neck and accordion section of squeaker and cow sound reed.

FIG. 2 again shows the inflating chamber and outer shell of the toy. At the neck of the outer shell and accordion tube 3 the tube is tapered to nest inside opening at the top of the dual chambers. The accordion section of the tube 4 ends in another tapered section 5 of the tube which houses the reed 6 and toning wedge 7. The air flowing through these parts creates the sound of a cow's moo. When the chamber is filled with air, either by a pet depressing the toy or a pet owner depressing the toy, the self-inflating inner chamber fills with air. The act of the air traveling through the cap and reed, through the accordion squeaker section and into the inner chamber produces a low sound that mimics a cow's "moo".

Figure 3:
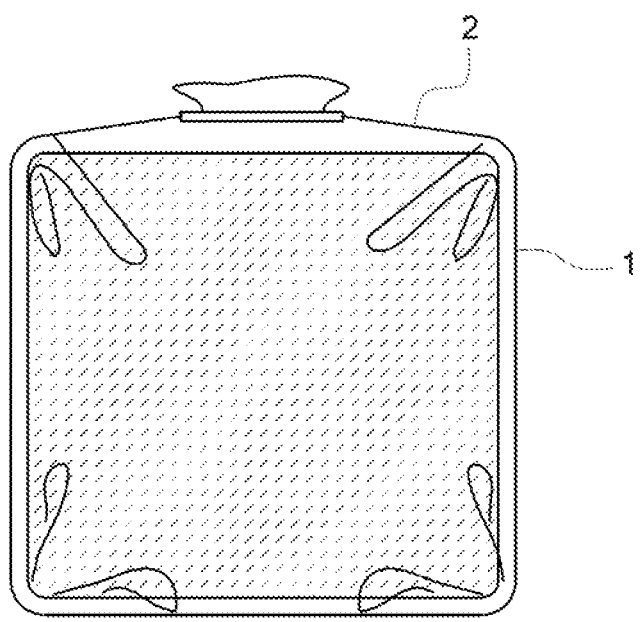
FIG. 3 is an enlarged view of the outer shell and membrane chamber.

FIG. 3 is simply an enlarged view of the chamber 1 and outer shell 2 in stasis. Since the inner chamber is self-inflating, and further may contain polyurethane foam between the two chambers, the toy will refill itself with air in a resting state after the pet is no longer manipulating the toy. In other words, the chamber refills with air and waits for a user to depress the toy and cause it to create the cow's "moo".

Figure 4:
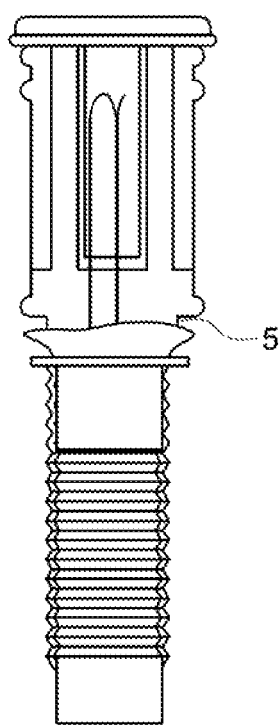
FIG. 4 is an illustration of the reed housing piece as connected to the accordion squeaker; an FIG. 5 is a top view of the squeaker strainer which aids in producing the cow sound.

FIG. 4 Shows the connecting point between the accordion squeaker section and the reed housing section 5. This connection is achieved by a snap-fit mode which holds the two sections together.

Figure 5:
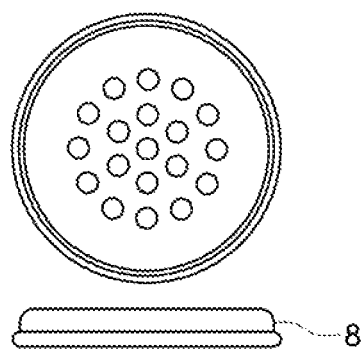

FIG. 5 is a perforated snap-fit cap 8 that resides atop the accordion style tube containing the reed and wherein the perforations aid in controlling the air flow and the resulting sound of the toy's "moo".

Figure 6:
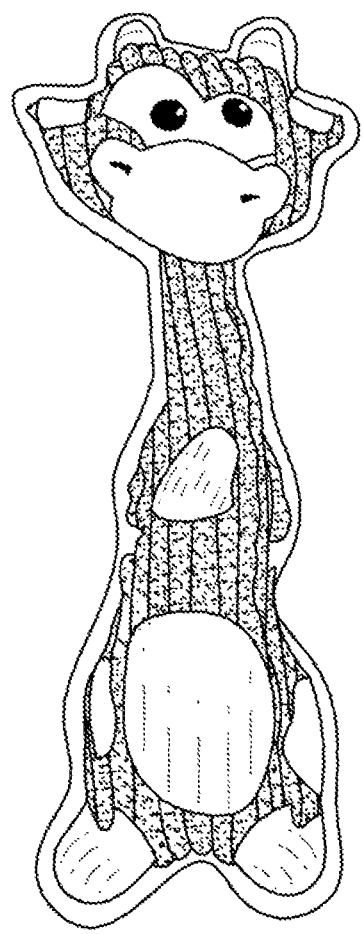
FIG. 6 is an example of the plush outer covering.

FIG. 6 is the front side embodiment for a plush outer shell in the design of a cow.

Figure 7:
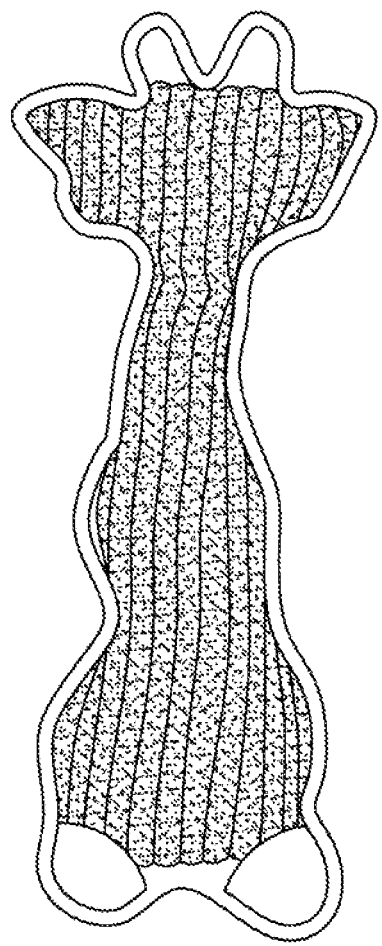
FIG. 7 is the rear view of plush cover.

FIG. 7 is the rear perspective of the plush outer shell in the design of a cow.

Figure 8:
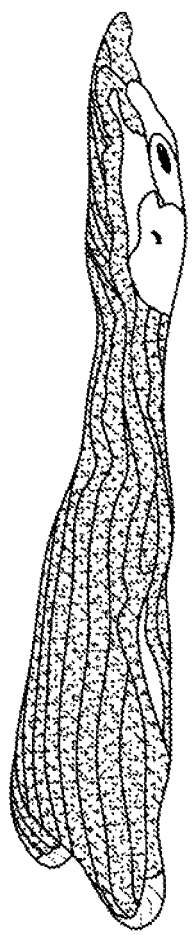
FIG. 8 is a side view of the plush cover.

FIG. 8 is a side perspective of the plush outer shell in the design of a cow.

The invention claimed is:

1. A pet toy comprising:
   a) A self-inflating bag chamber which resides in a flexible plastic outer shell for receiving air upon depression of the toy;
   b) A plastic injection molded accordion style tube with a tapered bottom portion to nest the self-inflating bag chamber into a tapered top portion of the outer shell;
   c) A reed located at a top portion of the accordion tube wherein the reed sits inside a plastic tube and wherein the reed also contains a toning wedge for creating a specific cow's "moo" sound;
   d) A snap fit cap with perforations fits atop the reed and toning wedge tube;
   e) A plush outer shell housing the plastic outer shell sewn to look like a cow.

2. A pet toy as in claim 1 wherein the self-inflating bag chamber is flexible for in-taking air via compression of the toy, through the reed and accordion tube; and wherein the chamber will naturally return to its original shape following depression.

3. A pet toy as in claim 1 wherein the flexible outer shell houses the self-inflating bag chamber, and wherein polyurethane foam is inserted between the inner self-inflating bag chamber and the outer shell to aid in shape retention of the inner chamber and outer shell.

4. A pet toy as in claim 1 wherein the injection molded plastic accordion style tube connects to a top of the outer shell wherein the bottom portion of the accordion style tube has a smooth surface for inserting into an opening of the outer shell in a snap fit connection, and the top portion of the accordion style tube has a smooth outer section which is not in accordion style.

5. A pet toy as in claim 4 wherein the reed and toning wedge are nested inside the top portion of the accordion tube in which is the non-accordion style section.

6. A pet toy as in claim 1 wherein the resulting sound that emits through the accordion style tube and reed portions to mimic the sound of a cow's moo excludes any other sound due to the specific design.

7. A pet toy as in claim 4 wherein the snap fit cap contains circular perforations and is affixed to the top of the non-accordion style section of the accordion style tube and allows a metered amount of air to flow through the reed and self inflating bag chamber.

8. A pet toy as in claim 1 wherein the plush outer shell is designed to look like a cow and excludes any other animal outer shell.

\* \* \* \* \*